(12) United States Patent
Takeoka et al.

(10) Patent No.: US 10,998,134 B2
(45) Date of Patent: May 4, 2021

(54) CAPACITOR AND METHOD FOR MANUFACTURING CAPACITOR

(71) Applicant: Panasonic Intellectual Property Management Co., Ltd., Osaka (JP)

(72) Inventors: Hiroki Takeoka, Nara (JP); Takashi Nakano, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 49 days.

(21) Appl. No.: 16/138,854

(22) Filed: Sep. 21, 2018

(65) Prior Publication Data
US 2019/0096579 A1 Mar. 28, 2019

Related U.S. Application Data (60) Provisional application No. 62/443,142, filed on Jan. 6, 2017.

(30) Foreign Application Priority Data

Mar. 23, 2016 (JP) .............................. JP2016-059250

(51) Int. Cl.
| H01G 4/33 | (2006.01) |
|---|---|
| H01G 4/38 | (2006.01) |
| H01G 4/40 | (2006.01) |
| H01G 2/10 | (2006.01) |
| H01G 4/224 | (2006.01) |
| H01G 4/228 | (2006.01) |
| H01G 2/04 | (2006.01) |
| H01G 4/008 | (2006.01) |
| H01G 4/32 | (2006.01) |

(52) U.S. Cl.
CPC ............... *H01G 4/224* (2013.01); *H01G 2/04* (2013.01); *H01G 2/106* (2013.01); *H01G 4/228* (2013.01); *H01G 4/33* (2013.01); *H01G 4/38* (2013.01); *H01G 4/40* (2013.01); *H01G 4/008* (2013.01); *H01G 4/32* (2013.01)

(58) Field of Classification Search
CPC ............ H01G 4/224; H01G 4/38; H01G 2/10; H01G 11/78; H01G 11/82; H01G 11/10; H01G 4/33; H01G 4/40; H01G 2/106
USPC .......... 361/517, 518, 519, 301.3, 301.5, 535
See application file for complete search history.

(56) References Cited

FOREIGN PATENT DOCUMENTS

| JP | H11-354373 A | 12/1999 | |
|---|---|---|---|
| JP | 2002367857 A | * 12/2002 | ............. H01G 4/228 |
| JP | 2007-165509 A | 6/2007 | |

(Continued)

OTHER PUBLICATIONS

International Search Report issued in International Application No. PCT/JP2017/010787 dated Jun. 13, 2017.

*Primary Examiner* — Arun Ramaswamy
(74) *Attorney, Agent, or Firm* — McDermott Will & Emery LLP (57) ABSTRACT

This capacitor includes: a capacitor element; a case made of metal and configured to house the capacitor element; and a thermosetting resin that is filled in the case. The case includes a bottom face and a side face, the side face surrounding four sides of the bottom face. The side face has formed therein a plurality of slit parts, the plurality of slit parts extending from an end, of the side face, at an opposite side to the bottom face toward the bottom face side.

7 Claims, 7 Drawing Sheets

(56) References Cited

FOREIGN PATENT DOCUMENTS

| | | |
|---|---|---|
| JP | 2012-069840 A | 4/2012 |
| JP | 2013-191720 A | 9/2013 |

\* cited by examiner

FIG. 5A — BEFORE HEATING

FIG. 5B — DURING HEATING

FIG. 5C — DURING COOLING

CAPACITOR AND METHOD FOR MANUFACTURING CAPACITOR

CROSS REFERENCE TO RELATED APPLICATION

This application is a continuation of International Application No. PCT/JP2017/10787 filed on Mar. 16, 2017, entitled "CAPACITOR AND METHOD FOR MANUFACTURING CAPACITOR", which claims priority under 35 U.S.C. Section 119 of Japanese Patent Application No. 2016-059250 filed on Mar. 23, 2016, entitled "CAPACITOR AND METHOD FOR MANUFACTURING CAPACITOR" and U.S. Provisional Application No. 62/443,142 filed on Jan. 6, 2017, entitled "CAPACITOR". The disclosure of the above applications is incorporated herein by reference.

BACKGROUND OF THE INVENTION

1. Field of the Invention

The present invention relates to a capacitor and a method for manufacturing a capacitor.

2. Disclosure of Related Art

Conventionally, case-mold-type capacitors in which a capacitor element is housed in a case made of metal and the case is filled with resin are known. Such a capacitor is excellent in heat dissipation since the case is made of metal.

In the capacitor mentioned above, as a resin to be filled in the case, an epoxy resin which is a thermoplastic resin is used. As a result of heating the case filled with an epoxy resin in a liquid state, the epoxy resin in the case is hardened.

The epoxy resin and the case undergo thermal expansion by being heated, and then, undergo thermal contraction by being cooled. The case is made of metal, and the coefficient of thermal expansion thereof is usually smaller than the coefficient of thermal expansion of an epoxy resin. Thus, the difference between these coefficients of thermal expansion causes, in the epoxy resin, compressive stress to easily occur during expansion and tensile stress to easily occur during contraction.

Thus, in the capacitor mentioned above, the compressive stress and the tensile stress could cause detachment at the interface between the hardened epoxy resin and the case, or a crack in the epoxy resin.

SUMMARY OF THE INVENTION

A first aspect of the present invention relates to a capacitor. A capacitor according to this aspect includes: a capacitor element; a case made of metal and configured to house the capacitor element; and a thermosetting resin that is filled in the case. Here, the case includes a bottom face and a side face, the side face surrounding four sides of the bottom face, and the side face has formed therein a plurality of slit parts, the plurality of slit parts extending from an end, of the side face, at an opposite side to the bottom face toward the bottom face side.

A second aspect of the present invention relates to a method for manufacturing a capacitor. The method for manufacturing a capacitor according to this aspect includes: housing a capacitor element in a case made of metal, the case including a bottom face and a side face, the side face surrounding four sides of the bottom face, the side face having formed therein a plurality of slit parts, the plurality of slit parts extending from an end, of the side face, at an opposite side to the bottom face toward the bottom face side; injecting a thermosetting resin in a liquid state into the case, the case housing the capacitor element and having each slit part covered by a covering part; and heating the case filled with the resin, to harden the resin.

It should be noted that the drawings are solely for description and do not limit the scope of the present invention by any degree.

DESCRIPTION OF THE PREFERRED EMBODIMENTS

Hereinafter, a film capacitor 1, which is one embodiment of a capacitor of the present invention, is described with reference to the drawings. For convenience, each drawing is provided with front-back, left-right, and up-down direction indications, as appropriate. It should be noted that the directions in the drawings merely indicate relative directions regarding the film capacitor 1, and do not indicate absolute directions.

In the present embodiment, the film capacitor 1 corresponds to "capacitor" described in claims. A cover tape 28 corresponds to "covering part" described in claims. A filling resin 30 corresponds to "resin" described in claims. Further, a front face 23, a rear face 24, a left face 25, and a right face 26 correspond to "four faces" described in claims.

However, the above description is merely provided in order to associate configurations in claims with configurations in embodiments, and the above-described correspondence does not limit the present invention described in claims to the configurations in embodiments by any degree.

Figure 1:
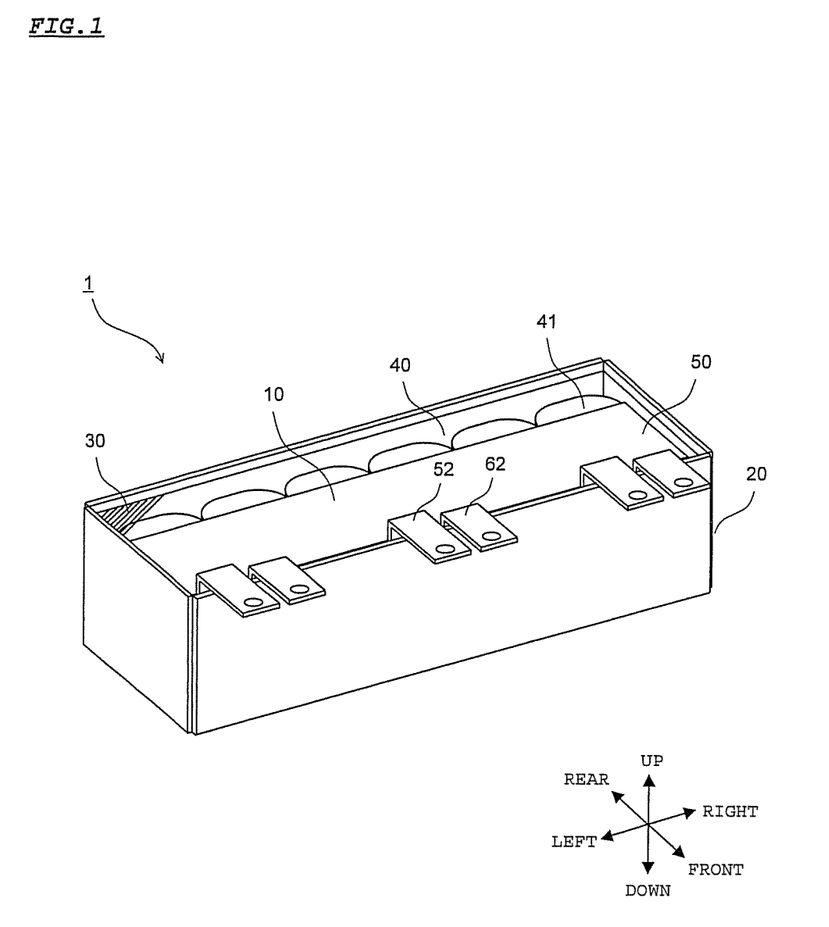
FIG. 1 is a front perspective view of a film capacitor according to an embodiment.
Figure 2A:
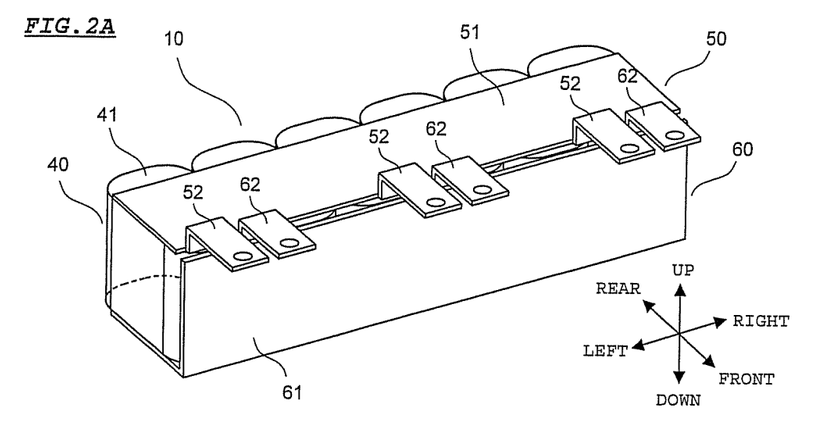
FIG. 2A is a front perspective view of a capacitor unit according to the embodiment.
Figure 2B:
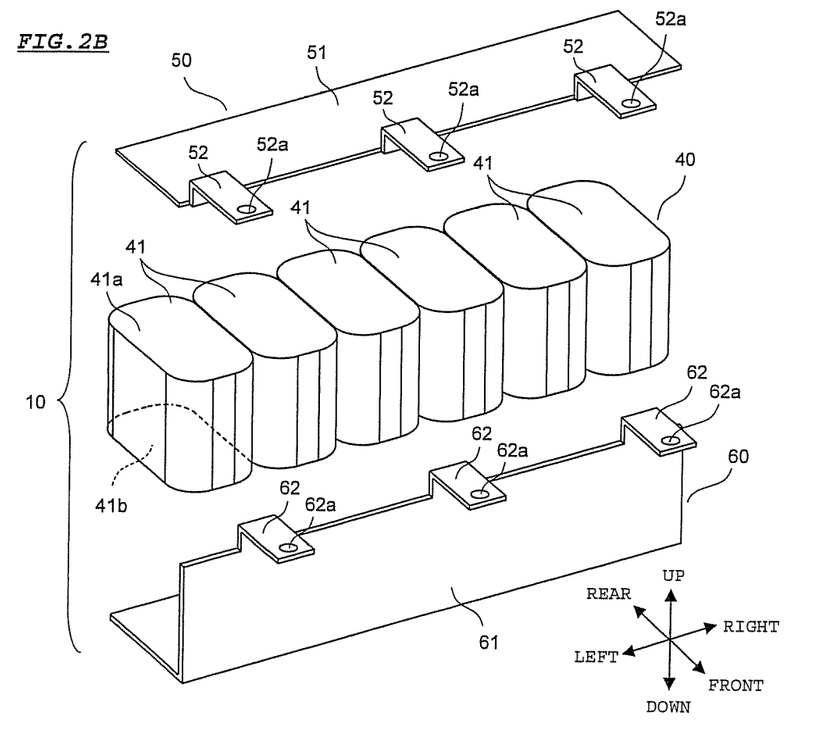
FIG. 2B is an exploded perspective view of the capacitor unit according to the embodiment.
Figure 3A:
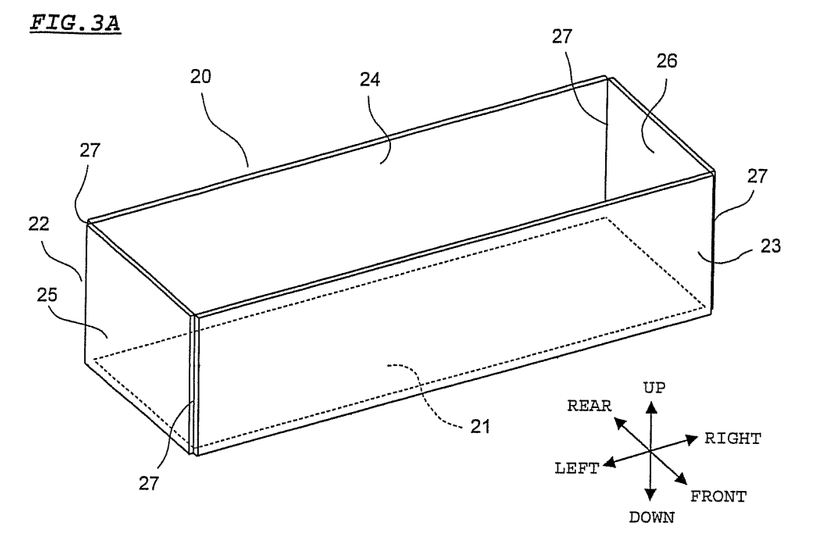
FIG. 3A is a front perspective view of a case according to the embodiment.
Figure 3B:
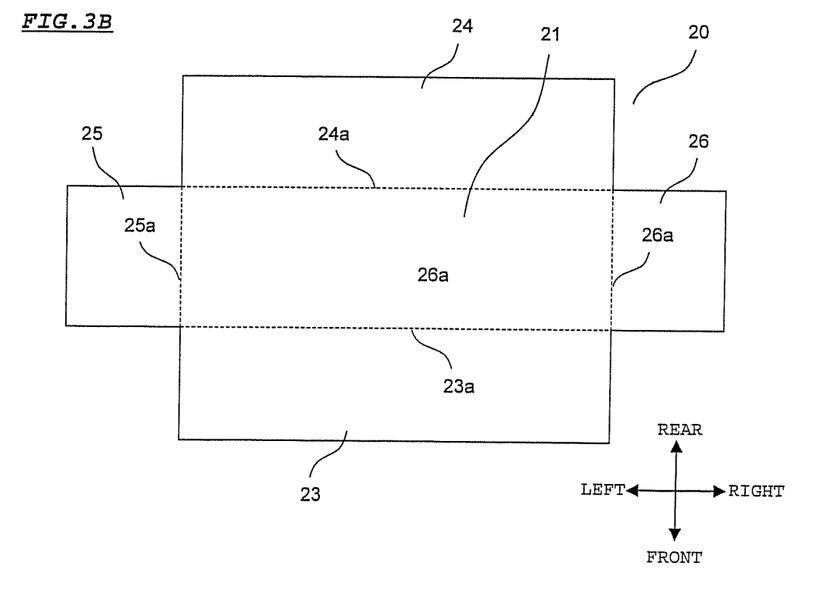
FIG. 3B is a development of the case according to the embodiment.

FIG. 1 is a front perspective view of the film capacitor 1 according to the present embodiment. FIG. 2A is a front perspective view of a capacitor unit 10 according to the present embodiment. FIG. 2B is an exploded perspective view of the capacitor unit 10 according to the present embodiment. FIG. 3A is a front perspective view of a case 20 according to the present embodiment. FIG. 3B is a development of the case 20 according to the present embodiment. For convenience, in FIG. 1, a part of a filling resin 30 is depicted with oblique lines, and the other part of the filling resin 30 is depicted in a transparent manner.

As shown in FIG. 1, the film capacitor 1 includes: the capacitor unit 10; the case 20 which houses the capacitor unit 10; and the filling resin 30 that is filled in the case 20.

As shown in FIGS. 2A and 2B, the capacitor unit 10 includes a capacitor group 40, an upper bus bar 50, and a lower bus bar 60.

The capacitor group 40 is composed of a plurality of capacitor elements 41 arrayed in the left-right direction. In the present embodiment, the capacitor group 40 is composed of six capacitor elements 41 arrayed in the left-right direction. Each capacitor element 41 is formed by: overlapping two metalized films, which are each obtained by vapor-depositing aluminium on a dielectric film; winding or stacking the overlapped metalized films; and pressing the resultant metalized films into a flat shape. Each capacitor element 41 is arranged such that both end faces thereof are oriented in the up-down direction. In each capacitor element 41, an upper end face electrode 41a is formed at the upper end face by spraying a metal such as zinc, and a lower end face electrode 41b is formed at the lower end face also by spraying a metal such as zinc. The capacitor element 41 of the present embodiment is formed from a metalized film obtained by vapor-depositing aluminium on a dielectric film, but instead, the capacitor element 41 may be formed from a metalized film obtained by vapor-depositing another metal such as zinc or magnesium. Alternatively, the capacitor element 41 may be formed from a metalized film obtained by vapor-depositing a plurality of metals among these metals, or may be formed from a metalized film obtained by vapor-depositing an alloy of these metals.

The upper bus bar 50 is formed from an electrically conductive material, for example, a copper plate, and includes a first electrode connection part 51 and three first connection terminal parts 52. The upper bus bar 50 is formed by, for example, being cut from one copper plate and being bent as appropriate, whereby the first electrode connection part 51 and the three first connection terminal parts 52 are integrally formed.

The first electrode connection part 51 has a plate shape that is long in the left-right direction, covers the upper end face electrode 41a of each capacitor element 41, and is electrically connected to the upper end face electrode 41a by use of a connection method such as soldering. The first connection terminal parts 52 are formed at a center portion, a left end portion, and a right end portion of a front end portion of the first electrode connection part 51. Each first connection terminal part 52 extends upward from the front end portion of the first electrode connection part 51, is then bent at a substantially right angle, and extends forward. A leading end portion of the first connection terminal part 52 protrudes forward with respect to the case 20 (see FIG. 1). A mounting hole 52a is formed in the leading end portion of the first connection terminal part 52. By being screwed using this mounting hole 52a, a terminal (not shown) from an external device is electrically connected to the first connection terminal part 52.

The lower bus bar 60 is formed from an electrically conductive material, for example, a copper plate, and includes a second electrode connection part 61 and three second connection terminal parts 62. The lower bus bar 60 is formed by, for example, being cut from one copper plate and being bent as appropriate, whereby the second electrode connection part 61 and the three second connection terminal parts 62 are integrally formed.

The second electrode connection part 61 is formed in an L-shaped plate shape that is long in the left-right direction, covers the lower end face electrode 41b of each capacitor element 41 and the front side of the peripheral face of each capacitor element 41, and is electrically connected to the lower end face electrode 41b by use of a connection method such as soldering. The second connection terminal parts 62 are formed at a center portion, a left end portion, and a right end portion of an upper end portion of the second electrode connection part 61. Each second connection terminal part 62 extends upward from the upper end portion of the second electrode connection part 61, is then bent at a substantially right angle, and extends forward. A leading end portion of the second connection terminal part 62 protrudes forward with respect to the case 20 so as to be adjacent to the first connection terminal part 52 of the upper bus bar 50 (see FIG. 1). A mounting hole 62a is formed in the leading end portion of the second connection terminal part 62. By being screwed using the mounting hole 62a, a terminal (not shown) from an external device is electrically connected to the second connection terminal part 62.

As shown in FIGS. 3A and 3B, the case 20 is formed from a metal material, for example, aluminium. The case 20 has a substantially rectangular parallelepiped box shape that is open at the upper face thereof and that is long in the left-right direction. The case 20 may be formed from a metal material other than aluminium, for example, iron or stainless steel.

The case 20 includes: a bottom face 21 having a rectangular shape; and a side face 22 which surrounds four sides of the bottom face 21. The side face 22 includes a front face 23, a rear face 24, a left face 25, and a right face 26, which respectively stand from the front, rear, left, and right sides of the bottom face 21. At each of four corner regions formed in the side face 22, a slit part 27 which extends from the upper end of the side face 22 toward the bottom face 21 is formed. Each slit part 27 extends to substantially the same position as that of the bottom face 21. As shown in FIG. 3B, if an aluminium plate is cut into a shape shown in the development of the case 20, and the front face 23, the rear face 24, the left face 25, and the right face 26 are bent inward from corresponding border portions 23a, 24a, 25a, and 26a with respect to the bottom face so as to stand perpendicularly therefrom, the case 20 is obtained in which the slit parts 27 are formed at four corner regions, i.e., at positions corresponding to four vertexes of the bottom face 21, as shown in FIG. 3A. It should be noted that each slit part 27 may not have a gap (width) therein or may have a small gap therein.

The filling resin 30 is a thermosetting resin, and is an epoxy resin, for example. The filling resin 30 may be a urethane resin. As shown in FIG. 1, the filling resin 30 covers the main portions of the capacitor unit 10 except the first connection terminal parts 52 of the upper bus bar 50 and the second connection terminal parts 62 of the lower bus bar 60, and protects the main portions from moisture and impacts.

Figure 4:
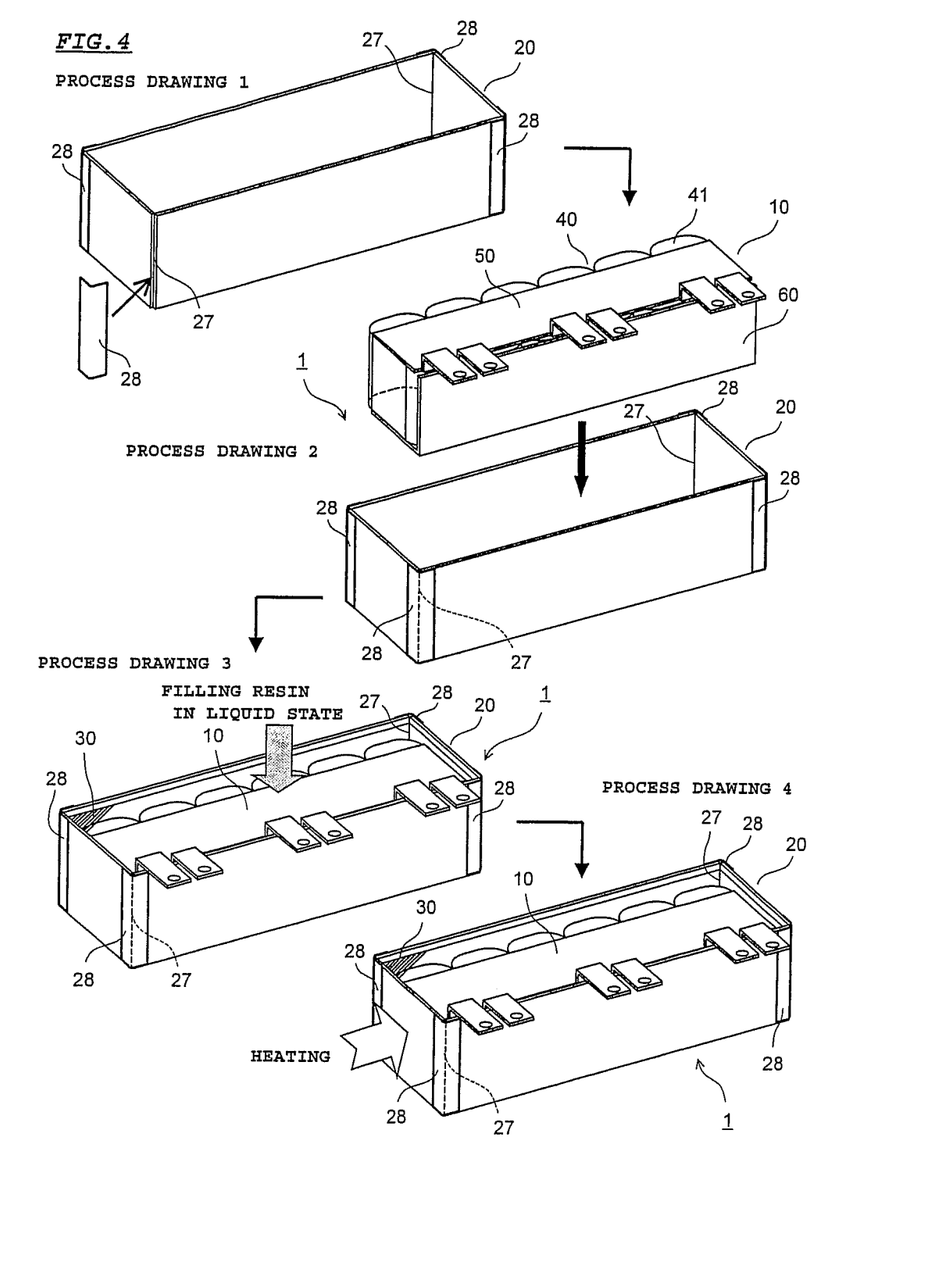
FIG. 4 is a diagram showing an assembly procedure of the film capacitor according to the embodiment.

FIG. 4 is a diagram showing an assembly procedure of the film capacitor 1 according to the present embodiment.

When the film capacitor 1 is to be assembled, first, as shown in process drawing 1, a heat resistant cover tape 28, for example, a polyimide film tape, is attached from outside to each of the four corner regions of the case 20, to cover a corresponding slit part 27. Next, as shown in process drawing 2, the capacitor unit 10, which has been assembled by joining the upper and lower bus bars 50, 60 to the capacitor group 40, is housed in the case 20.

Next, as shown in process drawing 3, the filling resin 30 in a liquid state is injected into the case 20, which houses the capacitor unit 10 and which has the slit parts 27 respectively covered by the cover tapes 28, whereby the case 20 is filled with the filling resin 30. In the present embodiment, the filling resin 30 has a viscosity of not less than 1500 mPa·s, at a temperature thereof being 60° C.

Each slit part 27 is covered with a corresponding cover tape 28 so as to prevent the filling resin 30 in a liquid state from leaking from the slit part 27. In addition, the filling resin 30 having a high viscosity is used as described above. This further eliminates the need to be concerned about leakage of the filling resin 30 from the slit part 27 covered by the cover tape 28.

Next, as shown in process drawing 4, the case 20 filled with the filling resin 30 is heated, whereby the filling resin 30 in the liquid state is hardened and fixed. At this time, the hardened filling resin 30 enters a state where the filling resin 30 is attached to the inside of the bottom face 21 and the side face 22 of the case 20.

Accordingly, a case-mold-type film capacitor 1 is completed. After the filling resin 30 in the case 20 has been cooled, the cover tapes 28 are removed from the case 20. The cover tapes 28 may be left attached to the completed film capacitor 1.

Figure 5A:
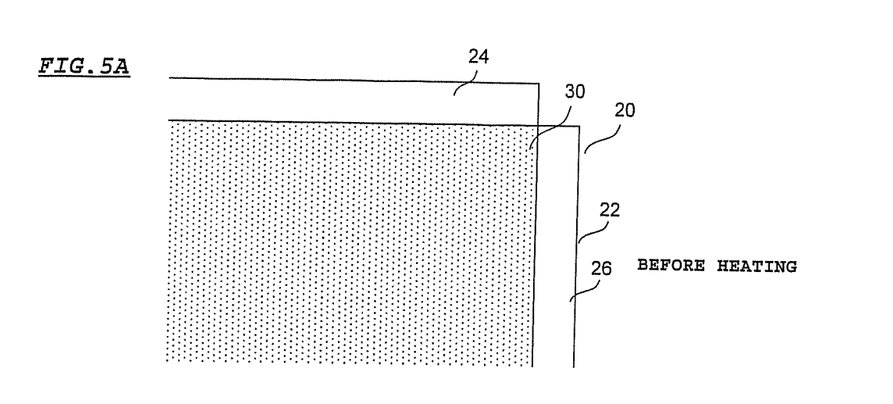
FIG. 5A is a diagram of a main part of the film capacitor showing a state of the filling resin and the case before heating.
Figure 5B:
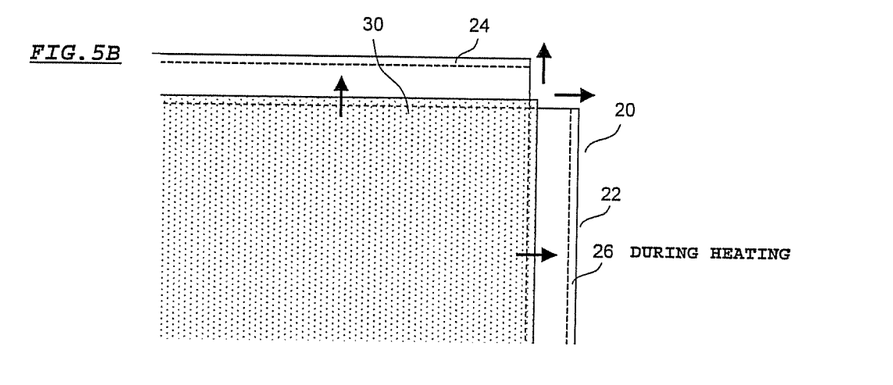
FIG. 5B is a diagram of a main part of the film capacitor showing a state of the filling resin and the case during heating.
Figure 5C:
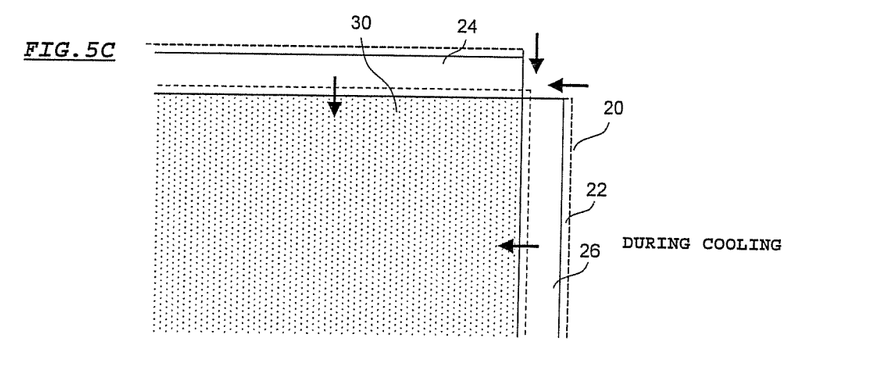
FIG. 5C is a diagram of a main part of the film capacitor showing a state of the filling resin and the case during cooling.

FIGS. 5A to 5C are diagrams of a main part of the film capacitor 1 showing states of the filling resin 30 and the case before heating, during heating, and during cooling, respectively. In FIGS. 5A to 5C, the rear face 24 and the right face 26 of the side face 22 of the case 20 are shown.

When the case 20 is heated after the filling resin 30 in a liquid state has been filled in the case 20 as shown in FIG. 5A, the filling resin 30 in the case 20 is hardened and thermally expands as shown in FIG. 5B. At this time, since the case 20 is made of aluminium, i.e., made of metal, and the coefficient of thermal expansion thereof is smaller than the coefficient of thermal expansion of the filling resin 30, the case 20 does not thermally expand relative to the filling resin 30. However, since the case 20 has the slit parts 27 formed at the corner regions thereof, and thus, as shown in FIG. 5B, the side face 22 (in FIG. 5B, the rear face 24 and the right face 26) is pushed by the thermally-expanded filling resin 30, and thus easily expands outward. By being absorbed by this expansion of the case 20, compressive stress is less likely to occur in the filling resin 30.

Then, when heating of the case 20 is stopped, the hardened filling resin 30 is cooled. In association with this cooling, the filling resin 30 undergoes thermal contraction. At this time, as shown in FIG. 5C, the expanded side face 22 of the case 20 easily contracts inward in accordance with the contraction of the filling resin 30, in a state where the side face 22 is attached to the filling resin 30. By being absorbed by this contraction of the case 20, tensile stress is less likely to occur in the filling resin 30.

Although the cover tape 28 is not shown in FIGS. 5A to 5C, since the cover tape 28 easily deforms (expands and contracts) compared with the case 20 which is made of metal, even if the case 20 expands as shown in FIG. 5B, the cover tape 28 deforms so as to extend in accordance therewith. Thus, there is no need to be concerned about the cover tape 28 peeling off from the case 20 when the case 20 expands and contracts. In addition, there is no need to be concerned about the cover tape 28 hindering the expansion and contraction of the case 20.

Effects of Embodiment

According to the present embodiment, the following effects are exhibited.

Since the slit parts 27 are formed in the side face 22 of the case 20, the side face 22 of the case 20 easily expands and contracts in accordance with thermal expansion and thermal contraction of the filling resin 30. Accordingly, compressive stress and tensile stress are less likely to occur in the filling resin 30, and thus, detachment is less likely to occur at the interface between the filling resin 30 and the case 20, and a crack is less likely to occur in the filling resin 30.

It should be noted that the filling resin 30 can be heated not only during manufacturing of the film capacitor 1, but also by heat generated by the capacitor elements 41 due to energization of the film capacitor 1. In the present embodiment, even when this heat causes the filling resin 30 to undergo thermal expansion and thermal contraction, detachment and a crack are less likely to occur in the filling resin 30, as in the manufacturing time.

Since the slit parts 27 are formed at the corner regions of the side face 22 of the case 20, stress can be absorbed well, in particular, at the corner regions of the filling resin 30 where stress (compressive stress, tensile stress) is likely to be concentrated. Thus, occurrence of detachment and a crack in the filling resin 30 can be effectively prevented.

As the filling resin 30, a thermoplastic resin having a viscosity of not less than 1500 mPa·s at a temperature of 60° C. is used. Therefore, without being concerned about leakage of the filling resin 30 from the slit parts 27 covered by the cover tapes 28, it is possible to fill the filling resin 30 into the case 20.

Although an embodiment of the present invention has been described, the present invention is not limited to the above-described embodiment, and the application example of the present invention can also be modified in various manners, not limited to the above-described embodiment.

<Modification 1>

Figure 6A:
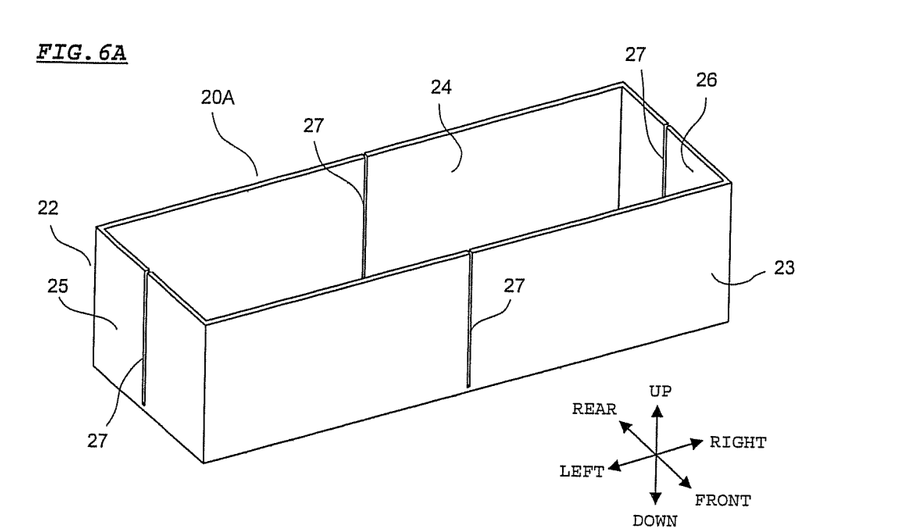
FIG. 6A is a front perspective view of a case according to Modification 1.

FIG. 6A is a front perspective view of a case 20A according to Modification 1.

In the case 20A of Modification 1, the slit parts 27 are not formed at the four corner regions of the side face 22, but are formed at substantially center portions of the front face 23, the rear face 24, the left face 25, and the right face 26, respectively.

Also in Modification 1, the side face 22 of the case 20 easily expands and contracts in accordance with thermal expansion and thermal contraction of the filling resin 30. Therefore, similar to the above-described embodiment, occurrence of detachment and a crack in the filling resin 30 can be inhibited.

<Modification 2>

Figure 6B:
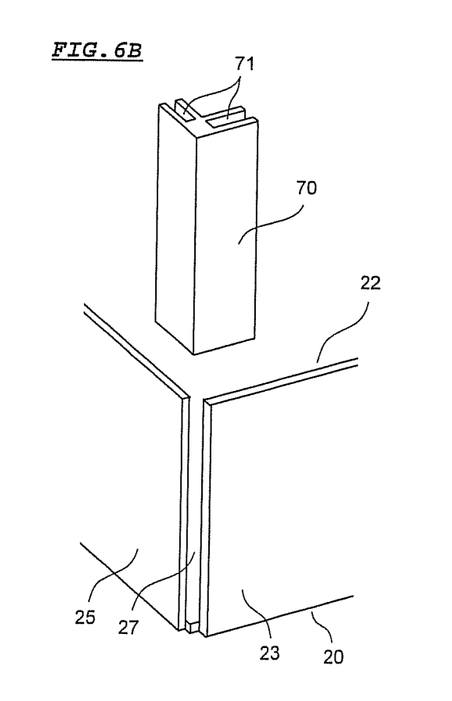
FIG. 6B is a diagram for describing a configuration in which a slit part of the case is covered by a covering member according to Modification 2.
Figure 6C:
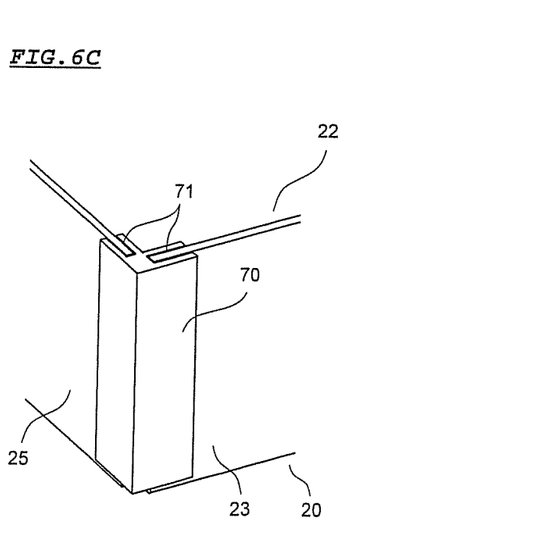
FIG. 6C is a diagram for describing a configuration in which a slit part of the case is covered by a covering member according to Modification 2.

FIGS. 6B and 6C are diagrams for describing a configuration in which each slit part 27 of the case 20 is covered by a covering member 70 according to Modification 2. FIG. 6B shows a state before the covering member 70 is mounted to the slit part 27, and FIG. 6C shows a state where the covering member 70 is mounted to the slit part 27. In Modification 2, this covering member 70 corresponds to "covering part" described in claims. In addition, an insertion groove 71 corresponds to "groove part" described in claims.

In the above-described embodiment, the slit parts 27 at the corner regions of the case 20 are covered by the cover tapes 28. In contrast to this, in Modification 2, the slit parts 27 are covered by the covering members 70.

Each covering member 70 is formed from a thermoplastic resin, for example, polybutylene terephthalate (PBT), is long in the up-down direction, and has a substantially L-shape in a plan view. The covering member 70 may be formed from polyphenylene sulfide (PPS) or nylon, instead of PBT. Insertion grooves 71 extending in the up-down direction are respectively formed at both sides of the covering member 70.

Each slit part 27 has a predetermined gap formed therein, and the covering member 70 is mounted in this gap from above. At this time, end portions of two faces that form a corner region of the side face 22 of the case 20, for example, the front face 23 and the left face 25, are fitted into the insertion grooves 71 provided at both sides of the covering member 70.

Each covering member 70 may be removed from the case 20 after the filling resin 30 has been cooled, or may be left mounted to the case 20. In a configuration in which the covering member 70 is to be removed from the case 20, a release agent is preferably applied in advance to a face, of the covering member 70, that comes into contact with the filling resin 30, so as to facilitate detachment of the filling resin 30 from the covering member 70.

Also in Modification 2, since each slit part 27 is covered by a corresponding covering member 70, the filling resin 30 in a liquid state can be prevented from leaking from the slit part 27.

It should be noted that the covering member 70 is made of resin, easily deforms in accordance with expansion and contraction of the case 20, and is less likely to hinder the expansion and contraction of the case 20.

<Modification 3>

Figure 7A:
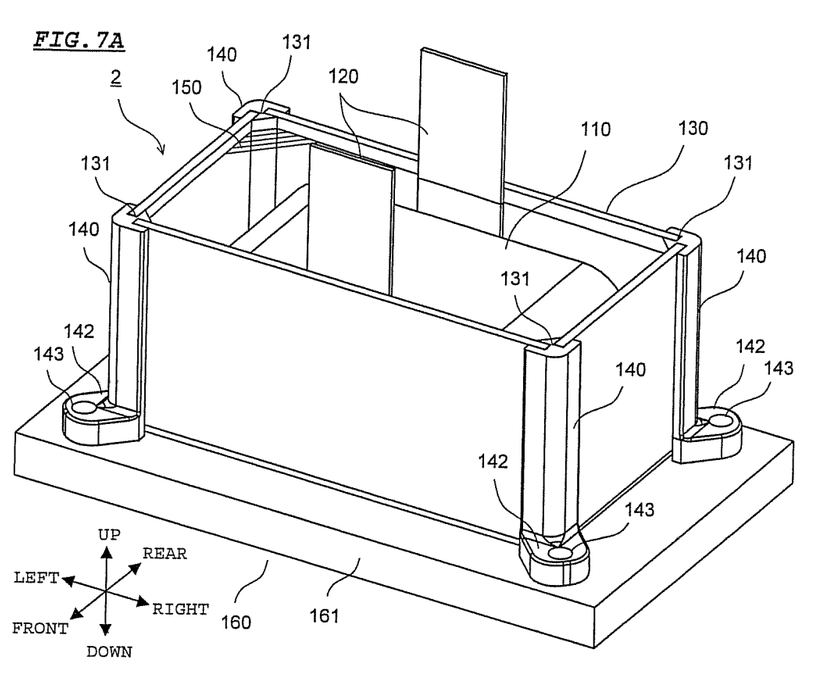
FIG. 7A is a perspective view of a film capacitor in a state where the film capacitor is installed at an installation part of an external device according to Modification 3.
Figure 7B:
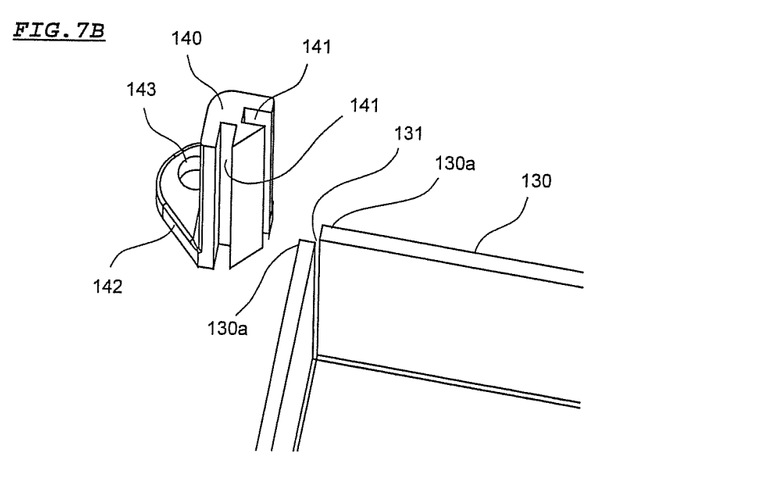
FIG. 7B is a perspective view of a corner region of the case and a covering member in a state where the covering member has been removed from the case.

FIG. 7A is a perspective view of a film capacitor 2 in a state where the film capacitor 2 is installed at an installation part 161 of an external device 160 according to Modification 3. FIG. 7B is a perspective view of a corner region of the case 130 and a covering member 140 in a state where the covering member 140 has been removed from the case 130. For convenience, in FIG. 7A, a part of a filling resin 150 is depicted with oblique lines, and the other part of the filling resin 150 is depicted in a transparent manner.

The film capacitor 2 according to Modification 3 includes: a capacitor element 110; a pair of bus bars 120; the case 130; four covering members 140; and the filling resin 150.

The configuration of the capacitor element 110 is the same as that of the capacitor element 41 in the above-described embodiment. The capacitor element 110 is housed in the case 130 such that end face electrodes at both ends are oriented in the front-back direction.

Each of the pair of bus bars 120 has one end thereof electrically connected to an end face electrode of the capacitor element 110, and has the other end thereof protruding above the case 130 so as to serve as a connection terminal part for an external terminal.

Similar to the case 20 of the above-described embodiment, the case 130 is formed from a metal material, for example, aluminium, and has a rectangular parallelepiped box shape that is long in the left-right direction. Slit parts 131 extending in the up-down direction are formed at four corner regions of the case 130.

Similar to the above-described embodiment, the thermosetting filling resin 150 is filled in the case 130 which houses the capacitor element 110 and the pair of bus bars 120.

Each covering member 140 is formed from a thermoplastic resin, for example, polybutylene terephthalate (PBT), is long in the up-down direction, and has a substantially L-shape in a side view. The covering member 140 may be formed from polyphenylene sulfide (PPS) or nylon, instead of PBT.

Insertion grooves 141 extending in the up-down direction are respectively formed at both sides of the covering member 140. In the covering member 140, a mounting part 142 is formed at a lower end portion thereof so as to protrude in the horizontal direction. The mounting part 142 is provided with a fixation hole 143 which penetrates the mounting part 142 in the up-down direction. The insertion groove 141 corresponds to "groove part" described in claims.

Each slit part 131 has a predetermined gap formed therein, and the covering member 140 is inserted into this gap from above. At this time, end portions 130a, at both sides of the slit part 131, of the case 130 are fitted into the insertion grooves 141 provided at both sides of the covering member 140. Accordingly, the four covering members 140 are fixed to the corner regions of the case 130 such that the covering members 140 close their corresponding slit parts 131.

The film capacitor 2 is installed at the installation part 161 of the external device 160 (or a housing 160 in some cases). When the film capacitor 2 is to be fixed to the installation part 161, the covering members 140 are utilized. That is, the mounting part 142 of each covering member 140 is fastened to the installation part 161 by means of a screw or a bolt (not shown) through the fixation hole 143, whereby the film capacitor 2 is fixed to the installation part 161.

According to Modification 3, similar to the above-described embodiment, the side face of the case 130 easily expands and contracts in accordance with thermal expansion and thermal contraction of the filling resin 150, and thus, occurrence of detachment and a crack in the filling resin 150 can be inhibited.

In addition, according to Modification 3, since each slit part 131 is covered by a corresponding covering member 140, the filling resin 150 in a liquid state can be prevented from leaking from the slit part 131.

When the case 130 is formed from a metal material, it is difficult to provide the case 130 with a mounting part for fixing the film capacitor 2 to the installation part 161. According to Modification 3, by utilizing the covering members 140 which cover the slit parts 131 of the case 130, it is possible to easily provide the mounting parts 142 to the case 130. Accordingly, the film capacitor 2 can be reliably fixed to the installation part 161.

Further, according to Modification 3, two insertion grooves 141 are formed in the covering member 140, and the end portions 130a, at both sides of the slit part 131, of the case 130 are inserted into the two insertion grooves 141. Therefore, simply by inserting the covering member 140 into the slit part 131 from above, it is possible to easily fix the covering member 140 to the case 130.

Further, according to Modification 3, since the covering member 140 is formed from a resin material, the covering member 140 easily deforms in accordance with expansion and contraction of the case 130, and is less likely to hinder the expansion and contraction of the case 130. Since the resin material is light in weight, the covering member 140 can be made light in weight, and the entirety of the case 130 including the covering members 140 can be made light in weight. Further, since the resin material has good workability, the covering member 140 can be formed inexpensively.

<Other Modifications>

In the above-described embodiment, the slit parts 27 are formed at four corner regions of the side face 22. However, the slit parts 27 may be formed at only two corner regions that are at diagonal positions with respect to each other among the four corner regions. In this case, the case 20 can easily expand and contract, although not so easily as when the slit parts 27 are provided at four corner regions, and thus, detachment and a crack are less likely to occur in the filling resin 30. Similarly, also in Modification 1, the slit parts 27 may be formed only at two faces that are opposed to each other among the front, rear, left, and right faces 23, 24, 25, and 26.

In the above-described embodiment, each slit part 27 extends substantially to the position of the bottom face 21. However, the slit part 27 may not extend substantially to the position of the bottom face 21. In this case, the slit part 27 preferably extends at least to the bottom face 21 side with respect to the center in the up-down direction of the side face 22.

Further, the number of capacitor elements 41 forming the capacitor group 40 is not limited to that shown in the above-described embodiment, and may be changed as appropriate in accordance with the necessary capacitance. That is, although six capacitor elements 41 are disposed in the above-described embodiment, the number of capacitor elements 41 is not limited thereto. A different number of capacitor elements 41 may be disposed, including a case where a single capacitor element 41 is disposed.

The capacitor element 41 is formed by: overlapping two metalized films, which are each obtained by vapor-depositing aluminium on a dielectric film; and winding or stacking the overlapped metalized films. However, instead of this, the capacitor element 41 may be formed by: overlapping an insulation film, and a metalized film obtained by vapor-depositing aluminium on both faces of a dielectric film; and winding or stacking the resultant films.

Further, in the above-described embodiment, the film capacitor 1 is described as one example of the capacitor of the present invention. However, the present invention can be applied to a capacitor other than the film capacitor 1.

In the above-described embodiment, the filling resin 30 is injected into the case 20 in a state where the slit parts 27 are covered by the cover tapes 28. However, when there is no need to be concerned about leakage of resin from the case 20 on the basis of the state of the gap of the slit part 27 or the viscosity of the filling resin 30, such as when there is substantially no gap in the slit parts 27 or the viscosity of the filling resin 30 is very high, the cover tapes 28 may not be used.

Further, the configuration of Modification 2 or 3 may be applied to the configuration of Modification 1.

In addition, various modifications can be made to the embodiment of the present invention as appropriate without departing from the scope of the technological idea defined by the claims.

It should be noted that the terms that indicate directions such as "upper", "lower", and the like in the description of the above-described embodiment indicate relative directions that are dependent only on the relative positional relationship among the component members, and do not indicate absolute directions such as vertical direction, horizontal direction, and the like.

What is claimed is:

1. A capacitor comprising:
a capacitor element;
a case made of metal and configured to house the capacitor element; and
a thermosetting resin that is filled in the case, wherein
the case includes a bottom component and side components standing from the bottom component and surrounding the bottom component,
wherein each of the side components is in direct contact with the bottom component, and is not in direct contact with an adjacent side component to have a slit between two adjacent side components,
wherein no material of the case is present in the slit, and
wherein the bottom component has a quadrangular shape having four sides.

2. The capacitor according to claim 1, wherein
the side components comprise four side components standing from the four sides, respectively, and
each of the four side components is not in direct contact with adjacent two side components.

3. The capacitor according to claim 1, wherein
the four sides of the bottom component includes first to fourth sides, and
the side components comprise first to fourth components,
the first component (1) extends from a first point between both ends of the first side to a second point between both ends of the second side adjacent to the first side through a first corner formed by the first side and the second side, and (2) stands from the bottom component,
the second component (1) extends from a third point, adjacent to the second point, between both ends of the second side to a fourth point between both ends of the third side adjacent to the second side through a second corner formed by the second side and the third side, and (2) stands from the bottom component,
the third component (1) extends from a fifth point, adjacent to the fourth point, between both ends of the third side to a sixth point between both ends of the fourth side adjacent to the third side through a third corner formed by the third side and the fourth side, and (2) stands from the bottom component,
the fourth component (1) extends from a seventh point, adjacent to the sixth point, between both ends of the fourth side to an eighth point, adjacent to the first point, between both ends of the first side adjacent to the fourth side through a fourth corner formed by the fourth side and the first side, and (2) stands from the bottom component, and
each of the first to fourth components is not in direct contact with adjacent two side components.

4. The capacitor according to claim 1, further comprising a covering member disposed between the adjacent two side components to close the slit.

5. The capacitor according to claim 4, wherein
the covering member has a mounting part to be fixed to an installation part to which the capacitor is installed.

6. The capacitor according to claim 4, wherein
the covering member has grooves, and
each groove receives one of the adjacent two side components.

7. The capacitor according to claim 4, wherein
the covering member is formed from a resin material.

* * * * *